(12) United States Patent
Balakrishnan et al.

(10) Patent No.: US 10,237,290 B2
(45) Date of Patent: Mar. 19, 2019

(54) METHODOLOGY FOR INTELLIGENT PATTERN DETECTION AND ANOMALY DETECTION IN MACHINE TO MACHINE COMMUNICATION NETWORK

(75) Inventors: Subramanian Balakrishnan, Cupertino, CA (US); Narendra Kumar Sharma, Sunnyvale, CA (US)

(73) Assignee: AERIS COMMUNICATIONS, INC., San Jose, CA (US)

( * ) Notice: Subject to any disclaimer, the term of this patent is extended or adjusted under 35 U.S.C. 154(b) by 428 days.

(21) Appl. No.: 13/533,815

(22) Filed: Jun. 26, 2012

(65) Prior Publication Data

US 2013/0346596 A1 Dec. 26, 2013

(51) Int. Cl.
*H04L 29/06* (2006.01)

(52) U.S. Cl.
CPC ................. *H04L 63/1425* (2013.01)

(58) Field of Classification Search
CPC ........... H04L 67/12; H04L 2012/40273; H04L 41/0213; H04L 41/0266; H04L 41/0273; H04L 41/028; H04L 41/082; H04L 43/0876; H04L 43/12; H04L 63/08; H04L 67/025; H04L 67/125; H04L 67/18; H04L 67/20; H04L 67/22; H04L 67/306
USPC ........................................................ 709/224
See application file for complete search history.

(56) References Cited

U.S. PATENT DOCUMENTS

| 7,103,504 | B1 * | 9/2006 | McGlaughlin | G06F 11/0709 |
| | | | | 702/182 |
| 7,844,687 | B1 * | 11/2010 | Gelvin et al. | 709/220 |
| 7,933,666 | B2 * | 4/2011 | Campbell et al. | 700/74 |
| 8,108,517 | B2 * | 1/2012 | Kalavade | 709/224 |
| 8,407,769 | B2 * | 3/2013 | Salmela et al. | 726/6 |
| 8,416,741 | B2 * | 4/2013 | Chan et al. | 370/329 |
| 8,565,080 | B2 * | 10/2013 | Kavanaugh et al. | 370/230 |
| 2007/0168053 | A1 * | 7/2007 | Hendrickson | G05B 15/02 |
| | | | | 700/28 |
| 2008/0114806 | A1 * | 5/2008 | Kosche | G06F 11/3409 |
| 2009/0106729 | A1 * | 4/2009 | Adi | G06Q 10/06 |
| | | | | 717/101 |
| 2009/0249129 | A1 * | 10/2009 | Femia | 714/47 |
| 2009/0327429 | A1 * | 12/2009 | Hughes et al. | 709/206 |
| 2010/0033575 | A1 * | 2/2010 | Lee et al. | 348/159 |
| 2010/0286937 | A1 * | 11/2010 | Hedley et al. | 702/60 |
| 2010/0302009 | A1 * | 12/2010 | Hoeksel | G01D 21/00 |
| | | | | 340/10.1 |
| 2011/0029830 | A1 * | 2/2011 | Miller | G06F 11/221 |
| | | | | 714/734 |

(Continued)

OTHER PUBLICATIONS

The International Search Report and the Written Opinion of the International Searching Authority dated Dec. 9, 2013 for International Application No. PCT/US2013/042304.

*Primary Examiner* — Kevin T Bates
*Assistant Examiner* — Ronak Patel
(74) *Attorney, Agent, or Firm* — Brundidge & Stanger, P.C.

(57) ABSTRACT

The present invention relates generally to network communications, and more particularly to machine-to-machine (M2M) data communications. The present invention provides for a method, apparatus and computer program product for detecting performance event data across a machine-to-machine (M2M) network indicative of anomalous performance of data and thereafter alerting users of performance issues in real-time or near real-time.

27 Claims, 8 Drawing Sheets

(56) References Cited

U.S. PATENT DOCUMENTS

| | | | |
|---|---|---|---|
| 2011/0060496 A1* | 3/2011 | Nielsen | G06Q 10/0631 701/31.4 |
| 2011/0125672 A1* | 5/2011 | Rosenthal | G06Q 40/04 705/36 R |
| 2011/0200052 A1* | 8/2011 | Mungo et al. | 370/401 |
| 2011/0252132 A1* | 10/2011 | Wetzer | G06F 9/542 709/224 |
| 2012/0304007 A1* | 11/2012 | Hanks | H04L 67/12 714/26 |
| 2012/0306613 A1* | 12/2012 | De La Rue | H04W 4/005 340/5.2 |
| 2012/0310559 A1* | 12/2012 | Taft | H02J 13/0013 702/62 |
| 2013/0201870 A1* | 8/2013 | Gupta | H04W 4/005 370/254 |
| 2013/0202291 A1* | 8/2013 | Cavaliere | H04B 10/07 398/33 |
| 2013/0332240 A1* | 12/2013 | Patri | G06Q 10/06 705/7.36 |
| 2013/0337867 A1* | 12/2013 | Brennan | H04W 24/02 455/558 |
| 2014/0206373 A1* | 7/2014 | Ljung | H04W 48/06 455/452.1 |
| 2014/0359552 A1* | 12/2014 | Misra | H04L 67/12 717/100 |
| 2015/0356497 A1* | 12/2015 | Reeder | G06Q 10/087 705/28 |

* cited by examiner

METHODOLOGY FOR INTELLIGENT PATTERN DETECTION AND ANOMALY DETECTION IN MACHINE TO MACHINE COMMUNICATION NETWORK

FIELD OF THE INVENTION

The present invention relates generally to network communications, and more particularly to machine-to-machine (M2M) data communications.

BACKGROUND OF THE INVENTION

Machine to machine (M2M) network communications involves technologies to communicate with other devices often of similar abilities, different from traditional cellular communication networks for instance. In basic M2M environments, a device having limited logic (such as a sensor, meter, etc.) is resident at a location to typically captured measurable event data (such as temperature, pressure, quantity, etc.). The device is connected through a communications network to a remote computer or server having an application layer of specific software. The data received from the device is converted to relevant information associated with the measured event data through the application and may often thereafter undergo analysis or further similar assessment. In many cases a device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices may stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of device having similar abilities, characteristically, for communicating with other systems and device on the same network.

FIG. 1 depicts a basic M2M communication network 100 having typical sensor-type devices 120, 130 and 140. In FIG. 1, the M2M network 100 has a central communication gateway 110 in which communications from devices 120, 130 and 140 are linked with a service provider network 150. The linkage may be wired or wireless, and is depicted as the security camera 120 and the water alarm sensor 130 are in wireless communication with the gateway 110. Similarly, the traffic camera sensor 140 is in wired communication with the gateway, though one will appreciate that there are many variations to the type and protocol of communication for FIG. 1.

From FIG. 1, data sensed and obtained by the devices is transmitted across the M2M network to the service provider network 150 where the data may be shared as raw data or converted to information, often though software applications. Notification equipment 160 wirelessly receives the data from the service provider network 150 and acts in accordance with the received data for the specific event. For instance where the notification equipment is an alert system to send a text to a building owner in the event of a water leak, and the water sensor has sent data indicating a water leak, the notification equipment will then trigger an event to notify the building owner. Similarly, from FIG. 1, where the user 170 receives a suite of rolling historical data as to traffic camera operation cycles, the user may then act accordingly based on the received cumulative information.

With the additional device and communication complexities however, M2M networks may often experience communication issues where communications from devices are continually sent to intended recipients in error (e.g., incorrect configurations), communications to non-receiving devices are frequently repeated from the source sender, and the M2M devices may be relentless in their communications as they have limited logic to determine self-awareness and communication benefit. Alarm sensors, for instance, may continuously transmit notifications of an alarm even though the receiving end has already acted upon the triggering event. Switch hoping of stationary devices may occur as well. Often these communication failures create unintended consequences involving bandwidth inefficiencies, traffic disruption, customer outages, further network complexities and additional costs. Unfortunately, many of these issues cannot be derived or determined by log file parsing for instance.

Therefore, what is desired is an approach to intelligently identify patterns, structure and anomalies in diagnostic data of communication events across M2M networks in real time or near real time proactively, and in a scalable and reliable manner.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application (i.e., app) or similar while the primary software and data are stored on servers or locations apart from the devices.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention includes a method for detecting performance event data across a machine-to-machine (M2M) network indicative of anomalous performance, comprising the steps of: determining by identification one or more performance events to monitor; acquiring data of one or more monitored performance events; comparing the acquired data with one or more predetermined event characteristic limits over a predetermined period in real-time or near real-time; and issuing an alert in response to compared acquired data exceeding the one or more predetermined event characteristic limits.

Another embodiment of the present invention includes 11. An apparatus for communicating and issuing alerts in response to event data exceeding one or more event thresholds in a machine-to-machine (M2M) network, comprising: a device protocol capable of communications with a server across a M2M network, a device capable of communicating with a server system across the network using a communication adapter; the server system having an application module for acquiring event data of one or more events, comparing acquired event data with one or more predetermined event characteristic limits over a predetermined period in real-time or near real-time; and issuing a command in response to compared acquired data exceeding the one or more predetermined event characteristic limits; and a notification means for issuing an alert to one or more recipients in response to the issued command, wherein the alert includes information in relation the event.

A further embodiment of the present invention includes a computer program product stored on a computer usable medium, comprising: computer readable program means for causing a computer to control an execution of an application to perform a method for detecting performance event data across a machine-to-machine (M2M) network indicative of anomalous performance, comprising the steps of: determining by identification one or more performance events to monitor; acquiring data of one or more monitored performance events; comparing the acquired data with one or more predetermined event characteristic limits over a predetermined period in real-time or near real-time; and issuing an alert in response to compared acquired data exceeding the one or more predetermined event characteristic limits.

DETAILED DESCRIPTION OF PREFERRED EMBODIMENTS

The present invention relates generally to network communications, and more particularly to machine-to-machine (M2M) data communications.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
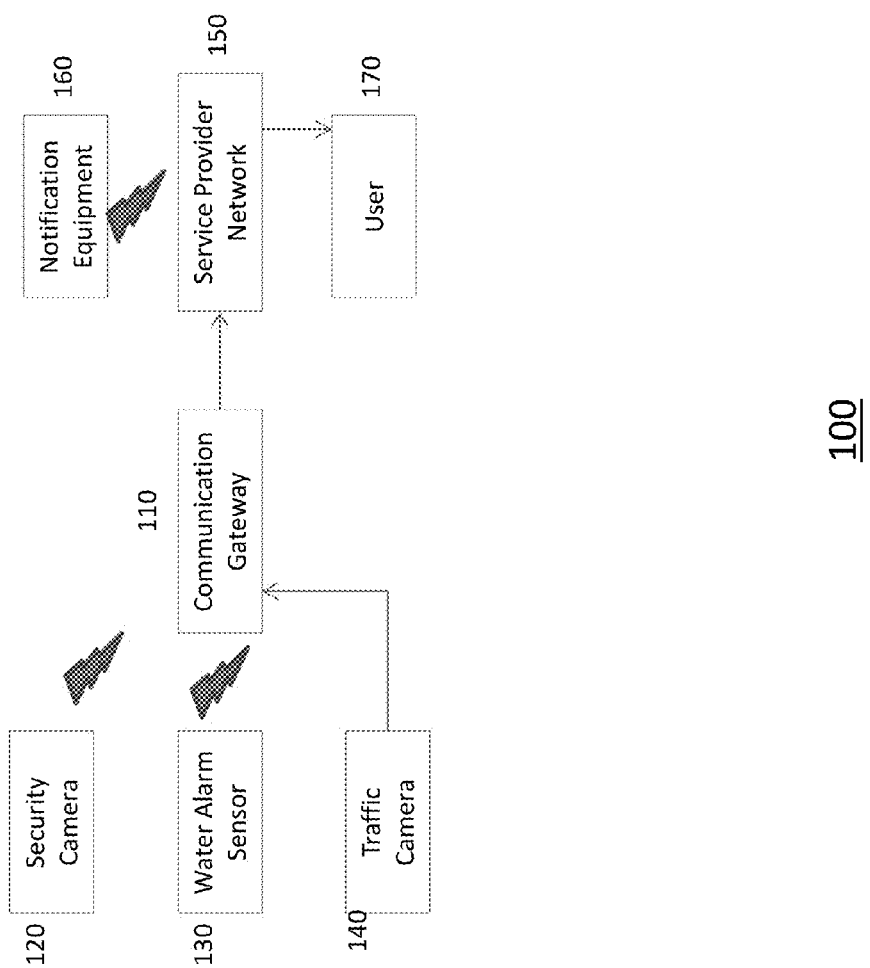
FIG. 1 depicts a basic M2M communication network having typical sensor-type devices.
Figure 2:
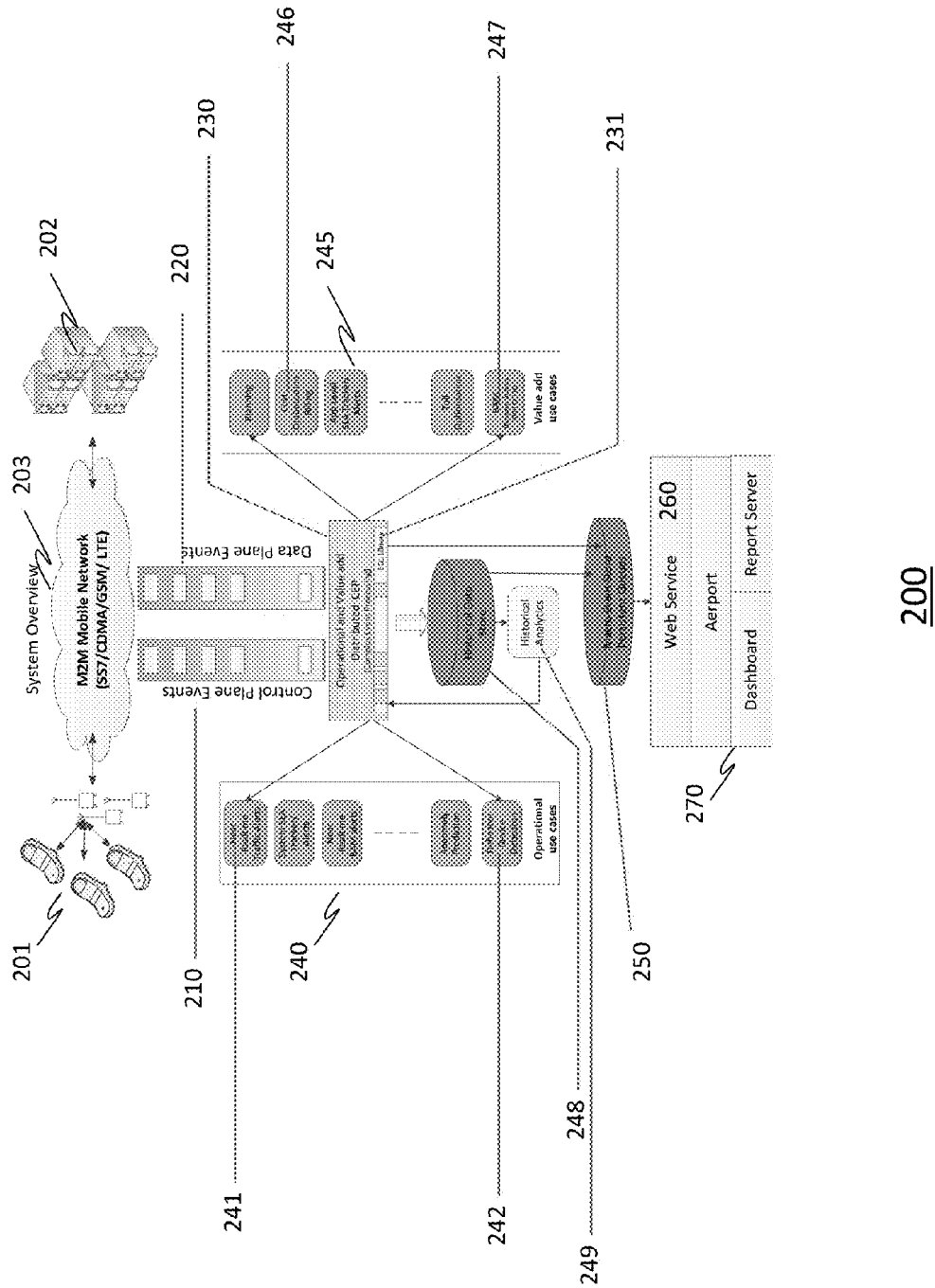
FIG. 2 illustrates a M2M network of the present invention in accordance with one or more embodiments.

FIG. 2 illustrates a M2M network 200 of the present invention in accordance with one or more embodiments. From FIG. 2, the present invention comprises devices 201 and servers 202 in communication across the network 203 using one or more communication architectures, methods, and networks, including but not limited to: Code division multiple access (CDMA), Global System for Mobile Communications (GSM) ("GSM" is a trademark of the GSM Association), Universal Mobile Telecommunications System (UMTS), Long Term Evolution (LTE), 4G LTE, wireless local area network (WIFI), and one or more wired networks. Messages containing information related to commands, status, data and instructions are passed between the device and the servers across networks 203. Network elements, as used herein, is a term intended to refer those devices, servers and attachments to the network.

From FIG. 2, in one or more embodiments of the present invention, the network elements in the M2M network generate both control plane events 210 and data plane events 220, where data for these events is often associated with a data log.

For instance, the control plane logs include events that occur on the routing platform where after system log messages associated with these events are generated. Message having control plane data packets of data typically include the receiving destination internet protocol (IP) addresses. Preferably the control plane logs are placed into file form such as a log, user terminal, routing platform console, or remote machine, and become part of the Complex Event Processing (CEP) 230. Similarly, data plane logs primarily include security events that the present invention has identified. Message having data plane packets of data typically will be forwarded by network devices to other end-station devices and contain destination internet protocol (IP) addresses and preferably will also become part of the CEP 230.

The CEP 230 determines from various input or predetermined settings what data events will be assessed and for what assessment those data events are being assessed. For instance, it may be of interest to determine whether there is a firewall issue in a communications situation, such that the byte stream in and the byte stream out at a particular node is to be assessed. Similarly, determining certain characteristic data or event activity over a predetermined period of time, frequency, interval or similar other objective measure, may also be preferably provided or part of a predetermined assessment. Further the manner in which these predetermined limits may be determined may be done by machine, preprogrammed, pre-arranged, determined by a set event or activity, or may be determined dynamically by input from an interested source (e.g., analyst, machine, dashboard user, etc.).

The CEP 230 defines the activity and the data stream to be assessed and gather the associated data with the inquiry. In one or more preferred embodiments the decision as to what data streams and what assessment to perform may also be dynamic in that a remote user or dashboard web-enabled feature provides the means for near real-time inquiry to identify data events to monitor and assess for anomalous performance.

The CEP 230 also gathers the various event streams of data for processing, identification and derivation of information in relation to the event data sought. The CEP preferably further includes an Event Query Language (EQL) 231 engine/library which is capable of querying the event data stream to identify the information of interest. While there are numerous inquiries and queries the present invention may be associated with and benefit the user in, for exemplary purposes, there are two types of use cases presented in FIG. 2.

From FIG. 2, an operational use case 240 and a value add use case 245 is set forth. The operational use case represents examples of type of operational events which are possible using the present invention in one or more embodiments. For instance "Near real-time traffic alerts" 241 and "Defective Device Detection" 242 are set forth within the operational use case block 240. Each of these cases presents a situation which involves an operational set of data based on devices in the field providing data about an operational event, such as traffic or non-communicating devices, for instance. As one of ordinary skill in the art will appreciate there are many variations and additional use cases beyond those set forth in FIG. 2 and incorporated herein that are appropriate for the present invention.

From FIG. 2, the value add use case 245 block is set forth. The value add use cases represents examples of type of continuing events for which it is possible to use the present invention in one or more embodiments. For instance "cost optimization billing" 246 and "Business Activity Monitoring (BAM)" 247 are set forth within the value add use case block 245. Each of these cases presents a situation which involves an on-going activity for which there are trends and analysis available to determine a range of acceptable instances and where data outside of those anticipated events is likely to create or signal an arising issue. As one of ordinary skill in the art will appreciate there are many variations and additional use cases beyond those set forth in FIG. 2 and incorporated herein that are appropriate for the present invention.

At the CEP 230, comparison of acquired data from the data stream is performed with respect to the inputs and/or predetermined characteristics defining acceptable criteria or unsatisfactory criteria. Typically, the CEP through logic, software, firmware, hardware and/or any combination thereof, will compare acquired data with the defined limits and assess for asymmetry or where there is a strong likelihood of anomaly occurrence, real-time or near real-time. Similarly, using pattern recognition means and logic, asymmetry relations can also be determined. Further, for patterns such as higher density of unidirectional traffic with specific bytes in/bytes out profile, such relations can be detected by the present invention quickly in real-time or near real-time such that those needing to know may be alerted to such information.

Upon the occurrence of identified data or acquired data exceeding the limits or established thresholds, an alert notice is generated by the CEP 230. The alert notice may preferably contain information as to its routing and receiving devices within and across the M2M network though such is not necessarily required by the present invention. Typically, in one or more preferred embodiments, it is envisioned that the alert notice is asynchronous.

Further at CEP 230, identified data may preferably be captured for use in assessment, determination, identification, etc., and passed to a Macro Event Store 250 or similar data storage location, database, or repository. The alert notice generated by the CEP 230 would preferably also be captured to the repository 250 where the repository may also perform as a routing interface (i.e., command interface) to provide message queue capability and message delivery to predetermined and/or identified message recipients. In one or more embodiments, the CEP 230 may further act as a message queuing means, message delivery means and prioritization of delivery of messages. Data repository 250 may also preferably receive EQL data 231 and information, including messages generated at CEP 230, is preferably stored in a historical data store 248 which may then be further assessed using historical data analytics 249 for further information assessment.

Further from FIG. 2, alert messages are made available for routing and delivery from the repository 250 to a web service manager utility 260 which may then further route the alerts to their intended recipients through additional communication routing means such as aeroport, dashboards, servers, etc. 270, though the present invention also envisions delivery through various modes of communications supported by a M2M network not necessarily shown on FIG. 2 as well.

Figure 3A:
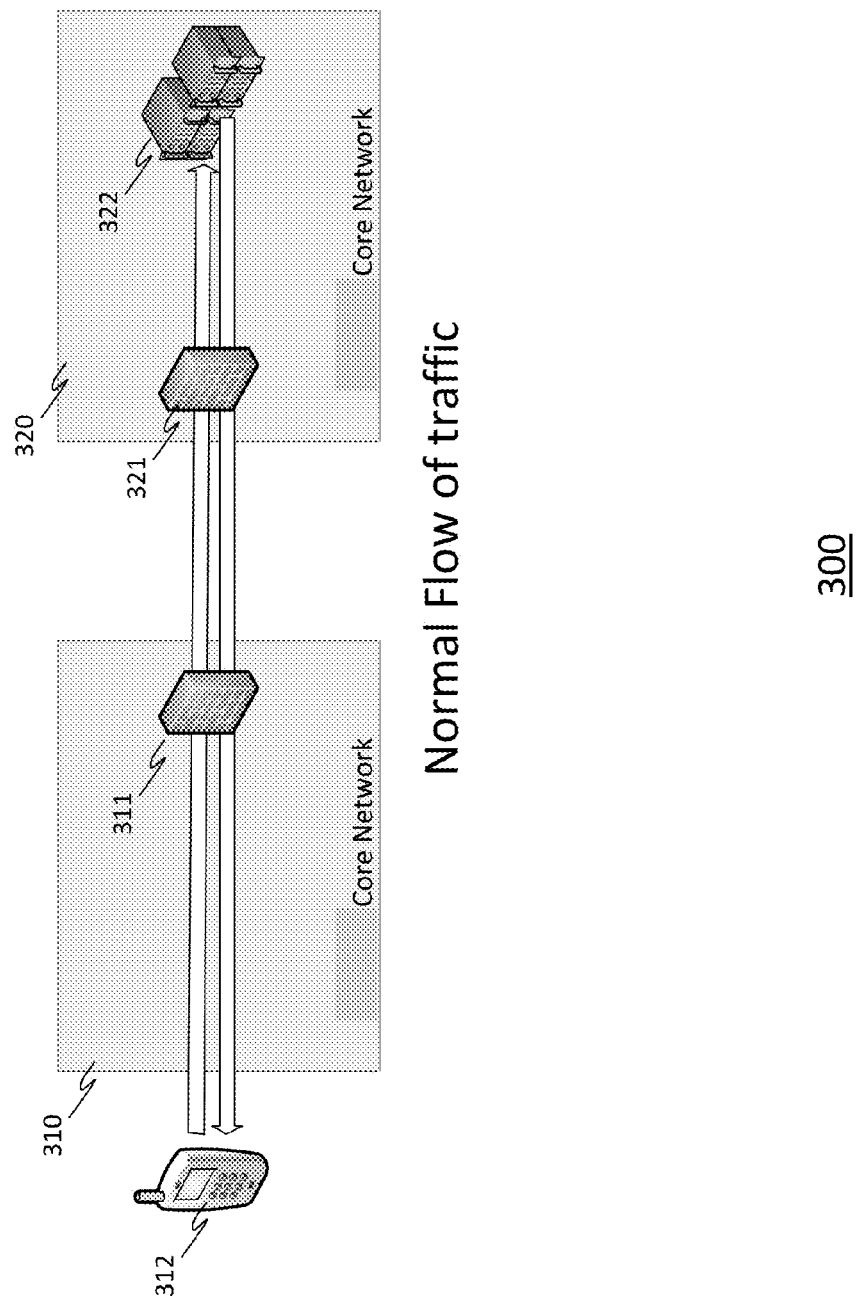
FIG. 3A depicts normal traffic flow of data as between two networks having firewalls, across a M2M network.

FIG. 3A depicts normal traffic flow 300 of data as between two networks having firewalls, across a M2M network. FIG. 3A depicts a representation of a standard network providing a secure VPN connection from the device to the backend servers it needs to connect and interact with under normal state where the firewalls allow traffic between the M2M devices and the backend server to normally flow. From FIG. 3A, a first core network 310 is in communication with a second core network 320 across a M2M network 330. A firewall 311 of the first network 310 is identified as is a firewall 321 of the second network 320 with servers 322. In FIG. 3A, the data flow from a first device 312 that is in communication through the first network to the second network is shown 300. Data is flowing normally as between the networks as the IP traffic from the device is reaching the back-end server in the first network as well as the server of the second network without incident.

Figure 3B:
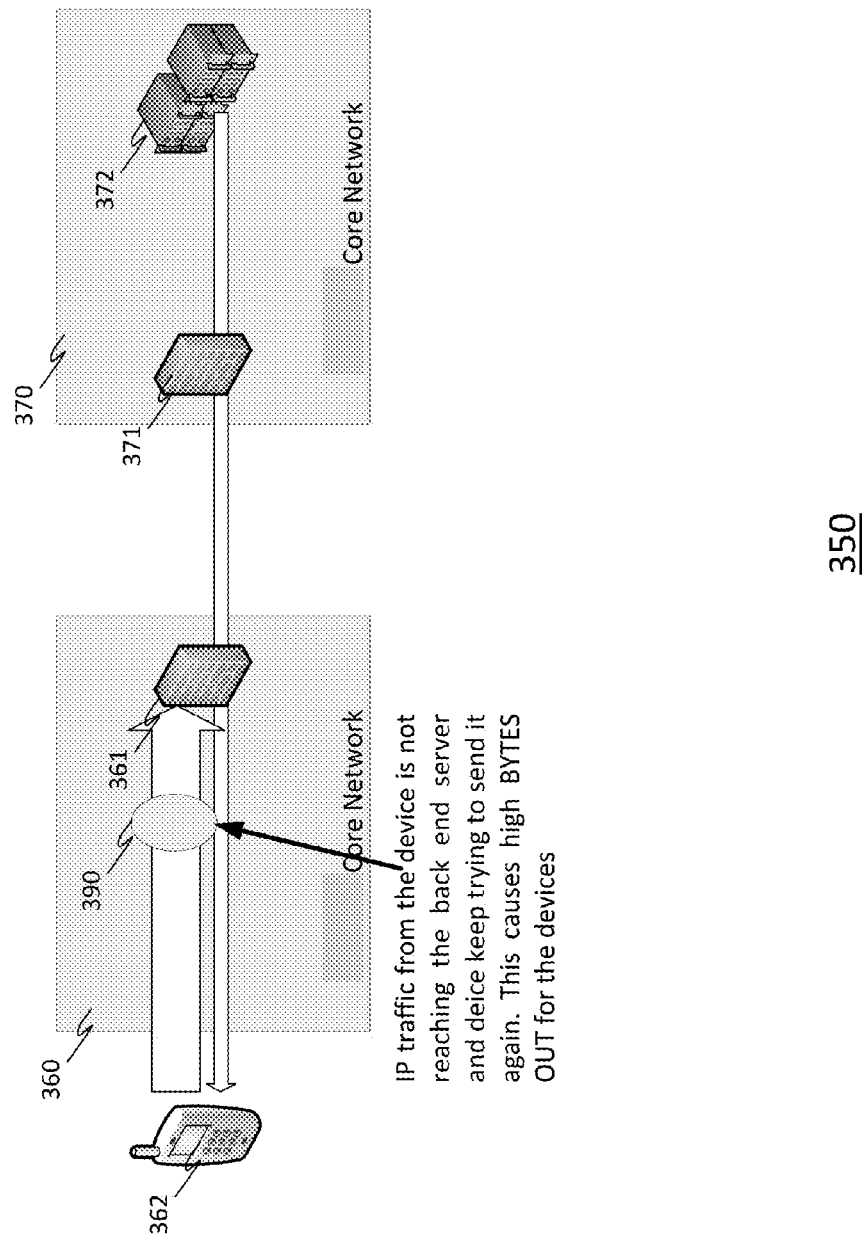
FIG. 3B depicts interrupted traffic flow of data as between two networks having firewalls, across a M2M network.

FIG. 3B depicts interrupted traffic flow 350 of data as between two networks having firewalls, across a M2M network. FIG. 3B depicts an affected traffic flow where, for various reasons, such as a firewall upgraded with incorrect configuration, traffic flow may be disrupted in one or both directions resulting in the identified M2M device continuously attempting communications to the entity on other side while adding load on the network and system, including associated costs. From FIG. 3B, a first core network 360 is in communication with a second core network 370 with servers 372 across a M2M network 380. A firewall 361 of the first network 360 is identified as is a firewall 371 of the second network 370. In FIG. 3B, the data flow from a first device 362 that is in communication through the first network to the second network is shown but the flow of data is failing within the first network at 390. Data is not flowing normally as between the networks as the IP traffic from the device is not reaching the back-end server in the first network. As the communication is not reaching the back end server of the first network, the device continues to attempt to send the data over and over causing "high bytes out" activity for the device.

Figure 4:
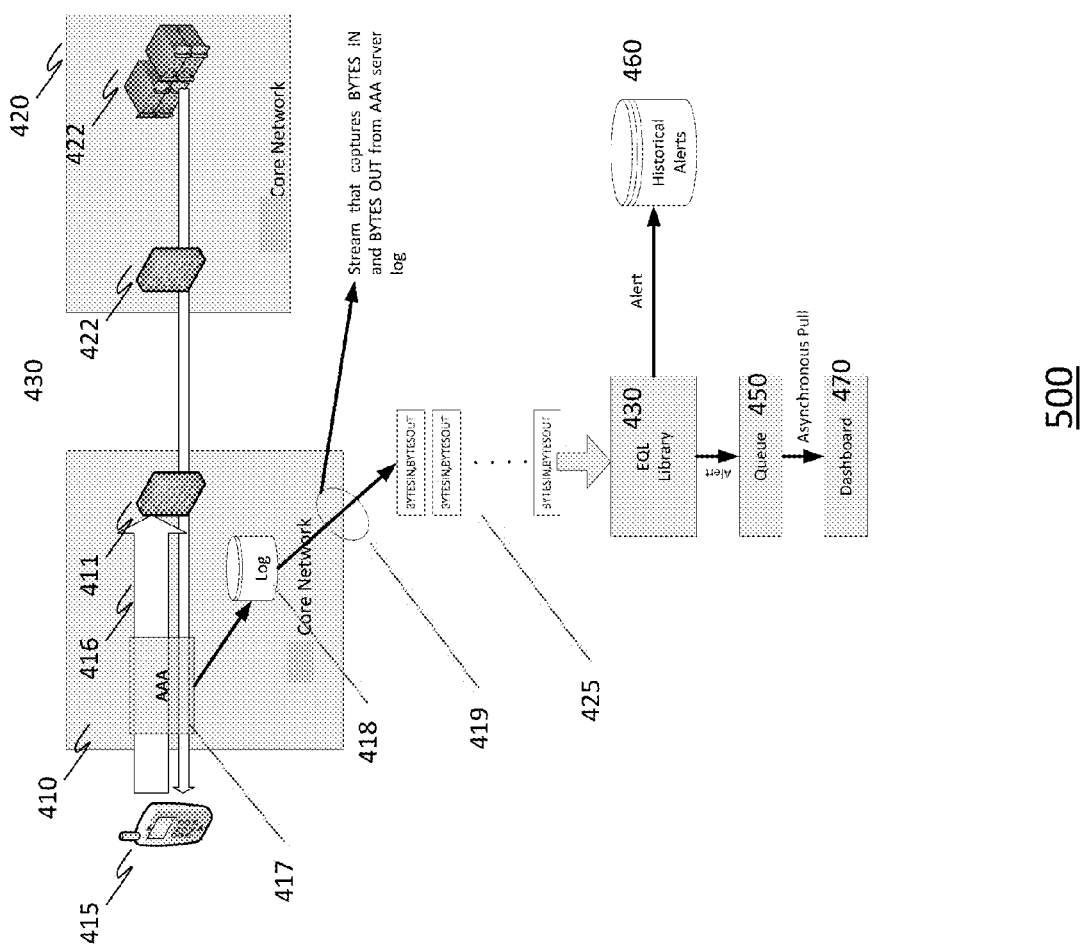
FIG. 4 depicts a procedural methodology of the present invention for identifying a pattern indicating a failed communication with a device on a M2M network in accordance with an embodiment of the present invention.

For the present invention, in one or more embodiments, the scenario of FIG. 3B may be quickly identified using the present invention as is set forth in FIG. 4. FIG. 4 depicts a methodology of the present invention for capturing identification of issues and providing alerts that could lead to actions such as addressing the firewall issue or pacifying the M2M device via remote commands to cease communication attempts. Operatively, the present invention would preferably seek patterns associated with anomalous behaviors, such as statistical shift in volume of directional flow of traffic, and correlate or compare it with other obtained data such as historical behavior of the device.

FIG. 4 depicts a procedural methodology 400 of the present invention for identifying a pattern indicating a failed communication with a device on a M2M network in accordance with an embodiment of the present invention. From FIG. 4, device traffic is interrupted as between two networks 410, 420 having firewalls 411, 421, across a M2M network 430. A first core network 410 is in communication with a second core network 420 with servers 422. A firewall 411 of the first network 410 is identified as is a firewall 421 of the second network 420. The data flow from a first device 415 that is in communication through the first network to the second network is shown but the flow of data is failing within the first network at 416. Data is not flowing normally as between the networks as the IP traffic from the device is not reaching the back-end server in the first network. As the communication is not reaching the back end server of the first network, which may be a AAA server 417 generating log files 418, the device continues to attempt to send the data over and over causing "high bytes out" activity for the device. A determination that a performance event to monitor is the capture of "bytes in" and "bytes out" is made at 419.

From FIG. 4, the CEP would then be arranged or configured at 419 to acquire data from a data stream that captures the performance event interests of "bytes in" and "bytes out" from the AAA server log files 418. Data of "bytes in" and "bytes out" is then captured at 425 and shared with the EQL library 430. The EQL Library 430 would then query the "bytes in" and "bytes out" of the data stream to identify and capture asymmetry in view of history, captured data over a period of time, or other performance characteristics defined. Once identified, an alert would be generated and placed into an alert queue 450 as well as stored in an event alert file 460. The alert would be sent to the prescribed receivers often resulting in an asynchronous pull effect, and may be made available at a dashboard 470, for instance.

By example, for a particular scenario, the EQL Library may query the AAA logs for a predetermined one hour time window. Alerts may be predetermined to be outputted to an interested party in relation to the Mobile Identification Number (MIN) of the device, though there are numerous other device indicators that are also envisioned by the present invention. After or concurrent with the output of the select statement being inserted into an alert history table and/or a message queue 460, a dashboard user interface (UI) component 470 is alerted and the dashboard UI components are populated with information, such as identifying the top listed devices and their associated MINs having symptoms of a firewall issue. It is envisioned by the present invention that the CEP and the EQL Library layer enable additional logic to be added.

In one or more preferred embodiments, using EQL, the capture of asymmetry described in FIG. 4 may be performed by using the language of, for example: select MIN, count(*) as ASSYM_BIBO from aaa_logs.win:time_batch(3600) where BYTESIN<120 and BUTESOUT>120 group by MIN order by count(*); where minimization of false positives may further include language such as, for example: select MIN, count(*) as ASSYM_BIBO from aaa_logs.win:time_batch(3600) where BYTESIN<120 and BYTESOUT>120 AND BASE_STN_ID NOT IN (LIST) group by MIN order by count(*).

Figure 5:
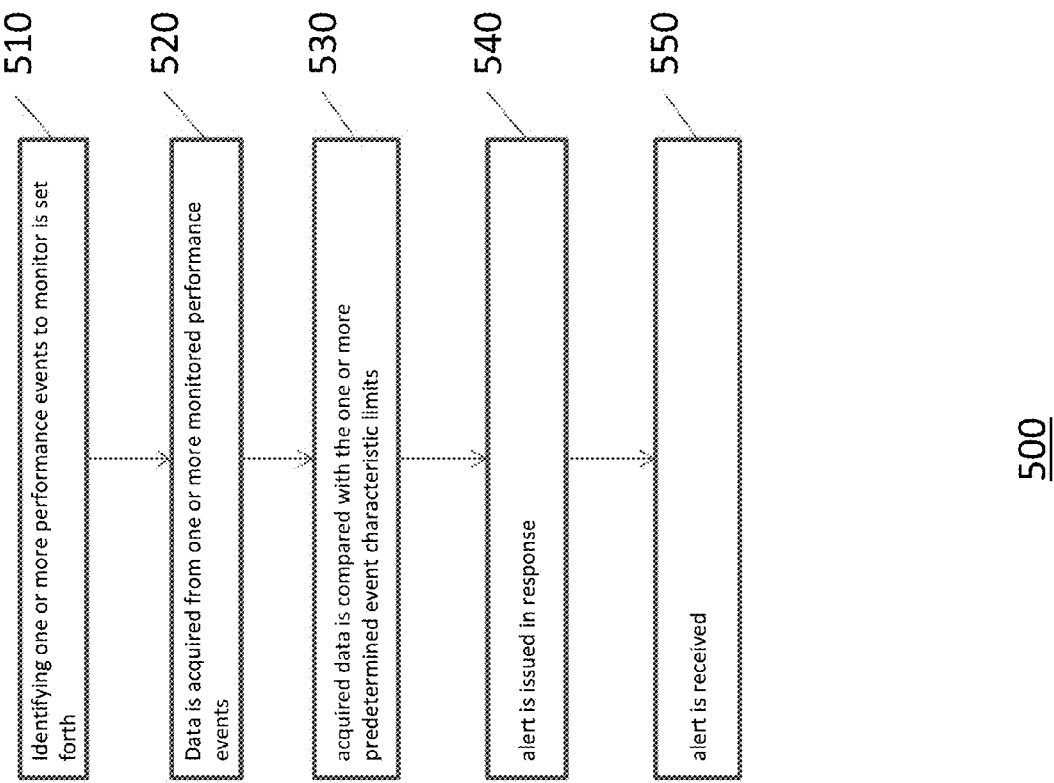
FIG. 5 depicts a method for detecting performance event data across a machine-to-machine (M2M) network indicative of anomalous performance.

FIG. 5 depicts a method 500 for detecting performance event data across a machine-to-machine (M2M) network indicative of anomalous performance. From FIG. 5, identifying one or more performance events to monitor is set forth at 510. Data is acquired from one or more monitored performance events at 520. The acquired data is compared with the one or more predetermined event characteristic limits over a predetermined period in real-time or near real-time at 530. An alert is issued in response to the compared acquired data exceeding the one or more predetermined event characteristic limits at 540. The alert is received by an interested party on the M2M network at 550.

Figure 6:
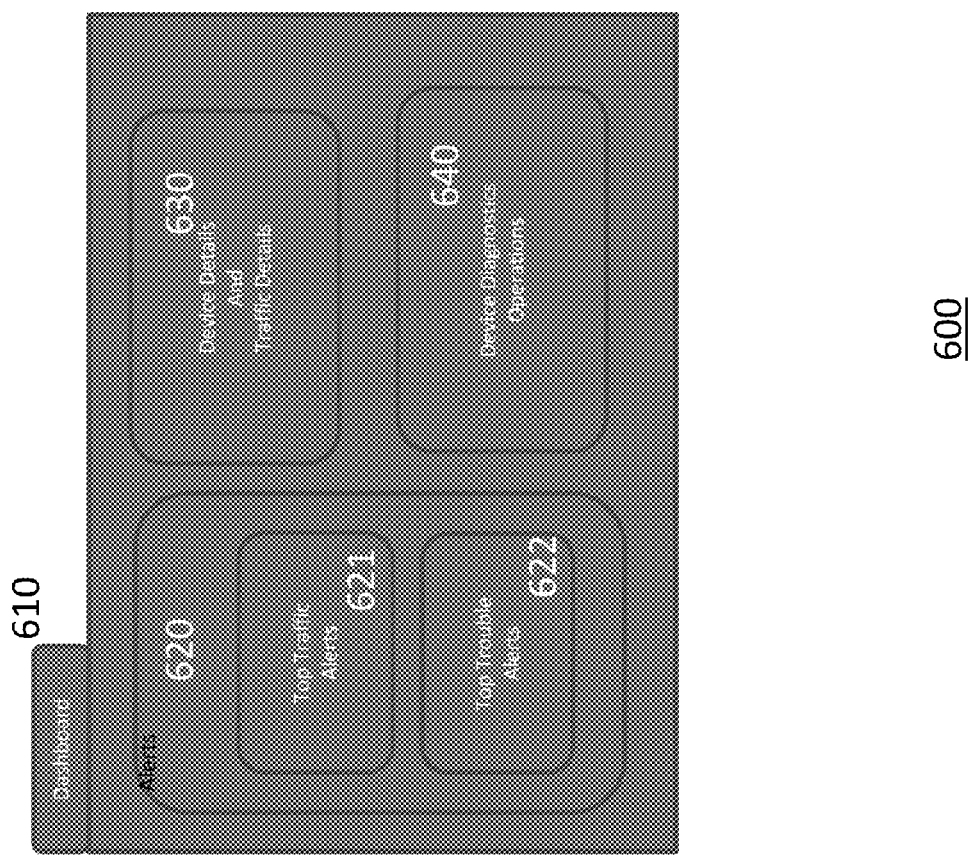
FIG. 6 presents an implementation of the present invention as a dashboard to report analysis.

FIG. 6 presents an implementation 600 of the present invention as a dashboard to report analysis. From FIG. 6, a dashboard 610 is presented which would assist a user in earlier identification of possible issues where analysis from diagnostic and similar operations can be viewed. Preferably, the dashboard would present real time and/or near real time analysis. An example of dashboard is set forth in FIG. 6, where there is an Alerts section 620, a device and details section 630 and a device diagnostics operations section 640. Within the Alerts section 620 there are sub-sections showing the top traffic alerts 621 and the top trouble alerts 622.

Further from FIG. 6, in one or more preferred embodiments, the Alerts section 620 displays near real time alerts from multiple sources (e.g., devices exceeding traffic thresholds and devices having trouble identified based on CEP). The details of the device(s), such as network status, device identifiers, location along with recent traffic history, would also be displayed or available for display in the dashboard 610. Similarly, the device diagnostics operations 640 would also provide for performing diagnostic operations to isolate problems, identify issues and provide resolutions.

It will be appreciated that the present invention is not so restricted as to have a layout as set forth by the exemplar of FIG. 6, but rather the present invention may have various dashboard displays, arrangements and contents depending upon the interests of the user without deviating from the scope and intent of the present invention.

Figure 7:
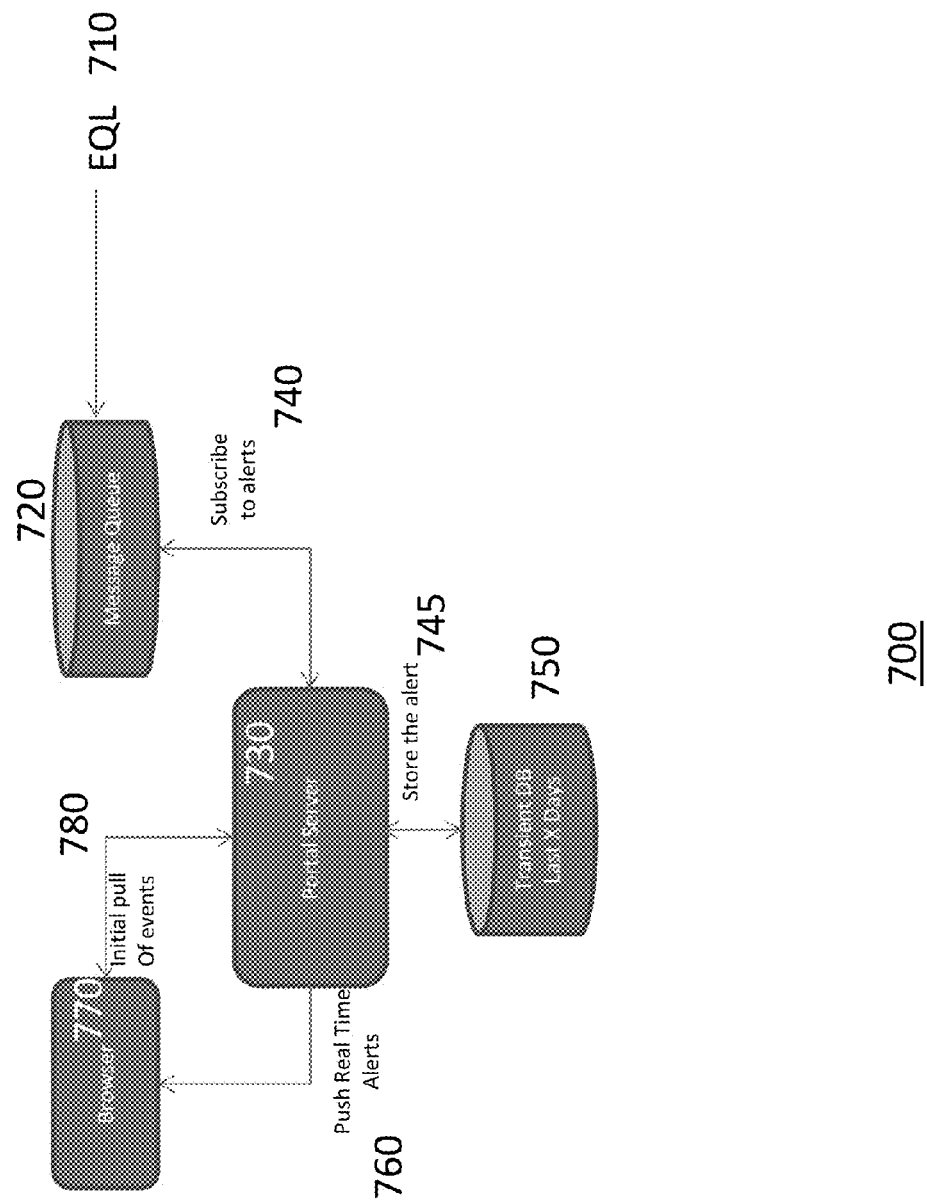
FIG. 7 sets forth an operational flow of alert traffic for the present invention.

FIG. 7 sets forth an operational flow of alert traffic 700 for the present invention. From FIG. 7, preferably, near real time alerts, in one or more embodiments, would be posted by the EQL service 710 to one or more multiple message queues 720, with respect to the classification of the posted alerts. The Portal Server 730 subscribes to the alerts along 740 based on certain filters having predetermined characteristics (i.e. preferences for alerts). The alerts received by the Portal Server 730 are stored 745 in a transient database or storage center 750 for a configurable duration. Similarly, the same alerts (as subscribed to) are pushed 760 to those connected clients in real time typically via browser 770. Other clients that may not be connected for real time receipt but are connectable by browser 770 are able to fetch events 780 that occurred within a predetermined time upon connection and may also then begin to receive real time alerts at 780.

Preferably, for the present invention, the predetermined output for providing information about the analysis and information of the present invention is a dashboard display having predetermined content in relation to user or predetermined characteristics and being visually configured to provide at least one of one or more real time alerts and one or more near real time alerts. Further the predetermined content is provided in relation to at least one or more of a classification of an alert, a filter having predetermined characteristics for identifying receipt of an alert, and a receiving location preference, though many variations are within the scope of the present invention.

Additional utilization of the present invention is envisioned in one or more embodiments where the sources available for integration may be identified and associated with creating or identifying data streams to gather associated data from within the network. For example AAA server logs to be used if one needs logic around IP traffic and HLR logs can be used to identify problems with registration of devices.

Using the CEP to form new data streams aside from data streams normally available within the network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

In one or more preferred embodiments, servers and/or back-end servers may include Authentication, Authorization and Accounting (AAA) servers.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:

1. A method for detecting network performance event data for one or more machine-to-machine (M2M) devices across an M2M network indicative of anomalous network performance, comprising:
   determining by identification one or more network performance events associated with at least one of the one or more M2M devices to monitor using complex event processing (CEP); wherein the one or more M2M devices comprise a processor having limited logic, a sensor and a communications adapter in communication with the M2M network;
   acquiring data of one or more monitored network performance events, wherein the CEP is configured to acquire data as "bytes in" and "bytes out" from a data stream that captures the monitored performance event;
   comparing the acquired "bytes in" and "bytes out" of the data stream to identify and capture asymmetry; and
   issuing an alert in response to the identified and captured asymmetry.

2. The method of claim 1, wherein the acquiring data further includes identifying one or more event data streams to monitor and identifying data within the one or more event data streams.

3. The method of claim 2, wherein the identifying data within the one or more event streams further includes sourcing information from one or more log files of a server.

4. The method of claim 3, wherein the server is an authentication, authorization and accounting server.

5. The method of claim 2, wherein the identifying data within the one or more event streams further includes capturing identified data for the comparing.

6. The method of claim 3, wherein the comparing further includes comparing the acquired data identified from the one or more event streams with one or more predetermined event characteristic limits over a predetermined period to identify asymmetry.

7. The method of claim 6, wherein the comparing further includes comparing the acquired data identified from the one or more event streams with one or more predetermined event characteristic limits over a predetermined period and with one or more historical files.

8. The method of claim 7, wherein at least one of the one or more historical files includes a historical alert file associated with the one or more events.

9. The method of claim 6, wherein the issuing an alert further includes associating a predetermined output routing for each of the one or more events.

10. The method of claim 9, wherein the issuing an alert further includes directing an asynchronous alert command to a command interface message queue associated with the predetermined output routing for receipt by one or more receiving devices associated with the predetermined output routing.

11. The method of claim 10, wherein the predetermined output is a dashboard display having predetermined content and being visually configured to provide at least one of one or more real time alerts and one or more near real time alerts.

12. The method of claim 11, wherein the predetermined content is provided in relation to one or more of a classification of an alert, a filter having predetermined characteristics for identifying receipt of an alert, and a receiving location preference.

13. The method of claim 11, wherein the dashboard display comprises at least one or more of an Alerts section displaying near real time alerts from multiple sources and a Device Details section displaying details of events in relation to a device.

14. An apparatus for communicating and issuing alerts in response to network event data exceeding one or more network event thresholds in one or more machine to machine (M2M) devices across an M2M network, comprising:
   a device protocol for communicating with a server across an M2M network, a device for communicating with a server system across the network using a communication adapter; the server system having an application module for
      determining by identification one or more network performance events associated with at least one of the one or more M2M devices to monitor using complex event processing (CEP); and
      acquiring event data of one or more monitored network performance events associated with at least one of the one or more M2M devices,
         wherein the CEP is configured to acquire the event data as "bytes in" and "bytes out" from a data stream that captures the monitored network performance event, and
         wherein the one or more M2M devices comprise a processor having limited logic, a sensor and a communications adapter in communication with the M2M network,
   wherein the processor, based on the limited logic, is configured to compare the acquired "bytes in" and "bytes out" of the data stream to identify and capture asymmetry; and issue a command in response to the identified and captured asymmetry; and
   wherein the communications adaptor transmits an alert to one or more recipients in response to the issued command, wherein the alert includes information in relation the network event.

15. The apparatus of claim 14, wherein the server system is in communication with one or more receiving devices.

16. The apparatus of claim 15, wherein the application module further includes logic to identify one or more event data streams to monitor and identify data within the one or more event data streams.

17. The apparatus of claim 15, wherein the application module further includes logic to capture identified data for the comparing.

18. The apparatus of claim 14, wherein the application module further includes logic to compare the acquired data identified from the one or more event streams with one or more predetermined event characteristic limits over a predetermined period to identify asymmetry.

19. The apparatus of claim 18, wherein the application module further includes logic to issue an alert to the one or more receiving devices.

20. The apparatus of claim 19, wherein the logic includes instruction to output a dashboard display having predetermined content and being visually configured to provide at least one of one or more real time alerts and one or more near real time alerts.

21. The apparatus of claim 19, wherein the logic is capable of providing predetermined content in relation to one or more of a classification of an alert, a filter having predetermined characteristics for identifying receipt and processing of an alert.

22. A computer program product stored on a non-transitory computer usable medium, wherein the computer usable medium causes a computer to control an execution of an application to perform a method for detecting network performance event data for one or more machine-to-machine (M2M) devices across an M2M network indicative of anomalous network performance, comprising:

determining by identification one or more network performance events associated with at least one of the one or more M2M devices to monitor using complex event processing (CEP); wherein the one or more M2M devices comprise a processor having limited logic, a sensor and a communications adapter in communication with the M2M network;

acquiring data of one or more monitored network performance events, wherein the CEP is configured to acquire data as "bytes in" and "bytes out" from a data stream that captures the monitored network performance event;

comparing the acquired "bytes in" and "bytes out" of the data stream to identify and capture asymmetry; and issuing an alert in response to the identified and captured asymmetry.

23. The computer program product of claim 22, further comprising:

identifying one or more event data streams to monitor and identify data within the one or more event data streams;

capturing identified data; and comparing the acquired data identified from the one or more event streams with one or more predetermined event characteristic limits over a predetermined period to identify asymmetry.

24. The computer program product of claim 23, further comprising comparing the acquired data identified from the one or more event streams with one or more predetermined event characteristic limits over a predetermined period and with one or more historical files associated with the one or more events.

25. The computer program product of claim 24, wherein the predetermined event characteristic limits and the predetermined period may be dynamically input through a connected receiving device within the M2M network.

26. The computer program product of claim 24, further comprising outputting instructions to display a dashboard having predetermined content and being visually configured to provide at least one of one or more real time alerts and one or more near real time alerts.

27. The computer program product of claim 26, wherein the predetermined content is provided in relation to one or more of a classification of an alert, a filter having predetermined characteristics for identifying receipt and processing of an alert.

\* \* \* \* \*